US012227981B2

(12) United States Patent
Schneiderbanger et al.

(10) Patent No.: US 12,227,981 B2
(45) Date of Patent: Feb. 18, 2025

(54) SPINDLE DRIVE FOR A CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Michael Schneiderbanger, Rattelsdorf (DE); Tobias Zwosta, Wilhelmsthal (DE)

(73) Assignee: Brose Fahrzeugteile SE & Co. Kommanditgesellschaft, Bamberg (DE)

(*) Notice: Subject to any disclaimer, the term of this patent is extended or adjusted under 35 U.S.C. 154(b) by 0 days.

(21) Appl. No.: 17/921,853

(22) PCT Filed: Apr. 30, 2021

(86) PCT No.: PCT/EP2021/061419
§ 371 (c)(1),
(2) Date: Oct. 27, 2022

(87) PCT Pub. No.: WO2021/224132
PCT Pub. Date: Nov. 11, 2021

(65) Prior Publication Data

US 2023/0175302 A1 Jun. 8, 2023

(30) Foreign Application Priority Data

May 4, 2020 (DE) ..................... 10 2020 111 986.0

(51) Int. Cl.
*E05F 15/622* (2015.01)
*E05F 1/10* (2006.01)

(52) U.S. Cl.
CPC ............ *E05F 15/622* (2015.01); *E05F 1/105* (2013.01); *E05F 1/1058* (2013.01); *E05Y 2201/474* (2013.01); *E05Y 2900/546* (2013.01)

(58) Field of Classification Search
CPC ....... E05F 15/622; E05F 1/105; E05F 15/611; E05F 15/63; E05F 1/1091; E05F 1/1058; E05Y 2900/548; E05Y 2900/546
See application file for complete search history.

(56) References Cited

U.S. PATENT DOCUMENTS 7,566,092 B2 * 7/2009 Paton .................... E05F 15/622 296/106
9,945,168 B2 * 4/2018 Leonard ..................... B60J 5/10
(Continued)

FOREIGN PATENT DOCUMENTS

CN 204984056 U 1/2016
DE 10330176 A1 5/2004
(Continued)

*Primary Examiner* — Justin B Rephann
(74) *Attorney, Agent, or Firm* — Dickinson Wright PLLC

(57) ABSTRACT

A spindle drive for a closure element of a motor vehicle including a downstream spindle/spindle nut mechanism, a spindle, a spindle nut and a spindle guide tube, for producing drive movements along a drive axis. A number of drive connections adjustable with respect to one another to transmit the drive movements, the first drive connection axially fixed to the spindle guide tube, a second drive connection axially fixed to the spindle, a drive spring configured to produce drive movements along the drive axis, the spindle guide tube has a first outer radius extending along at least one axial portion and on a side facing the first drive connection, a tube end portion with a tube end edge, that the tube end portion is widened radially so that the tube end edge has an outer end edge radius which is greater than the first outer radius.

20 Claims, 3 Drawing Sheets

(56) References Cited

U.S. PATENT DOCUMENTS

| | | | | |
|---|---|---|---|---|
| 9,976,332 | B2 * | 5/2018 | Scheuring | F16D 7/06 |
| 10,100,568 | B2 * | 10/2018 | Scheuring | E05F 15/622 |
| 10,280,674 | B2 * | 5/2019 | Leonard | E05F 1/1041 |
| 2012/0000304 | A1 * | 1/2012 | Hamminga | E05F 15/622<br>74/89.23 |
| 2016/0144694 | A1 * | 5/2016 | Shchokin | B60J 5/107<br>475/331 |
| 2017/0145727 | A1 * | 5/2017 | Yamagata | E05F 15/622 |
| 2017/0191553 | A1 * | 7/2017 | Heiberger | F16H 25/2418 |
| 2019/0211604 | A1 * | 7/2019 | Scheuring | E05F 15/70 |

FOREIGN PATENT DOCUMENTS

| | | | |
|---|---|---|---|
| DE | 102014105956 | A1 | 10/2015 |
| DE | 102016118412 | A1 | 3/2017 |
| DE | 102019100202 | A1 | 7/2019 |
| WO | 2009020610 | A1 | 2/2009 |

* cited by examiner

SPINDLE DRIVE FOR A CLOSURE ELEMENT OF A MOTOR VEHICLE

CROSS-REFERENCE TO RELATED APPLICATIONS

This application is the U.S. National Phase of PCT Application No. PCT/EP2021/061419 filed on Apr. 30, 2021, which claims priority to German Patent Application No. DE 10 2020 111 986.0, filed on May 4, 2020, the disclosures of which are hereby incorporated in their entirety by reference herein.

TECHNICAL FIELD

The present disclosure relates to a spindle drive for a closure element of a motor vehicle.

BACKGROUND

Vehicles may include a spindle drive configured for use in all types of adjustment or closure elements of a motor vehicle. Exemplary closure elements are tailgates, boot lids, side doors, bonnets or the like.

SUMMARY

One challenge here is that drive connectors and the drive housing of a spindle drive are usually plastic components, as a result of which the latter melt in the case of a fire and the drive spring may be released. This is prevented to some extent in that the drive connector is configured with a metal portion which is connected to the spindle guide tube and thus secures the drive spring. However, this is complex in terms of production technology.

The present disclosure attempts to provide a spindle drive in which the drive spring is secured in a stable manner while achieving low production costs.

As one example, radially enlarging the spindle guide tube at one end and securing the drive spring by means of this radial enlargement may address the problem of unintentional movement of the drive spring.

In one or more embodiments, the spindle guide tube on the side thereof that faces the first drive connector has a tube end portion having a tube end edge, that the tube end portion across at least part of the circumference thereof is radially enlarged, in particular bent open, in such a manner that the tube end edge, proceeding from the drive longitudinal axis, has an outer end edge radius which is larger than the first external radius, and that the enlarged tube end portion secures the drive spring in relation to a movement along the drive longitudinal axis.

This approach makes possible a plurality of solutions for securing the drive spring that are cost-effective in terms of production technology. The term "securing" means that the enlarged tube end portion, at least in many cases in which, depending on the design embodiment, some or else all surrounding components, such as the plastics components, break off or melt, supports the drive spring directly or indirectly and prevents any further expansion.

In another embodiment, the drive spring in the assembled state is additionally axially supported directly or indirectly on the enlarged tube end portion. During the operation of the spindle drive, the drive spring in this instance at times, may exert a spring force on the enlarged tube end portion. Accordingly, the tube end portion in this instance serves not only for securing the drive spring, but also for fastening the latter during the normal operation.

As an example, the enlarged tube end portion, may be enlarged in a completely encircling manner, or only in portions, depending on the requirement.

In another embodiment, a securing element is provided and the securing element set may include at least one securing element. A relatively simple construction results when the securing element is disposed about the spindle guide tube. As an example, the tube end portion may be enlarged only slightly and that the securing radius is increased by means of the securing element.

In another embodiment, the drive spring in the axial direction contacts directly the enlarged tube end portion. Depending on a radius of the drive spring, the tube end portion may be correspondingly enlarged for this purpose; no further securing element is required for this purpose.

In one or more embodiments, the tube end portion may include a bend portion which may have different bending angles.

In one or more embodiments, the first drive connector may include a connector portion connected to the spindle guide tube.

As an example, the securing element, of the first drive connector and the second drive connector may be formed of a plastic material.

In another embodiment, the tube portion is enlarged in such a manner that a maximum external tube radius in the tube portion is smaller than a minimum winding radius of the drive spring.

Reference may be made to all embodiments pertaining to the first teaching according to the proposal. The embodiments pertaining to the tube end portion apply in analogous manner to the tube portion; however, the tube end edge can in principle be disposed in an arbitrary manner, for example also be bent inward again.

In one or more embodiments, the tube portion is radially enlarged, and the spindle guide tube is simultaneously connected directly to the drive connector.

BRIEF DESCRIPTION OF THE DRAWINGS

The invention will be explained in more detail hereunder by means of a drawing which illustrates only exemplary embodiments. In the drawing FIG. 1 in a schematic perspective view shows the rear of a motor vehicle having a spindle drive according to the proposal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "closure element" in the present context is to be understood as being comprehensive. The term includes tailgates, trunk lids, hoods, side doors, sliding doors, elevating roofs, sliding windows, etc.

The spindle drive being discussed is however used primarily in tailgates and trunk lids in motor vehicles. Said spindle drive typically serves for the motorized adjustment of the closure element between an open position and a closed position.

The known spindle drive (DE 10 2014 105 956 A1), from which the invention proceeds, has a spindle/spindle nut gear mechanism having a spindle, a spindle nut and a spindle guide tube. Furthermore, said spindle drive has drive connectors for discharging driving movements, one of said drive connectors being assigned to the spindle and one being assigned to the spindle guide tube. The spindle guide tube, owing to the cylindrical shape thereof, usually has a mostly constant external radius. The drive connector that is assigned to the spindle guide tube, on said external radius, by way of a connector portion is inserted into the spindle guide tube and crimped to the latter. In addition to the spindle/spindle nut gear mechanism and a drive unit for driving the spindle/spindle nut gear mechanism the known spindle drive has a drive spring which preloads the drive connectors away from one another and thus supports the drive unit. This drive spring is usually conceived to match the weight of the tailgate and is designed so as to be correspondingly strong.

Drive springs of this type, in particular in the case of a fire, can become a risk when said drive springs are released from the remaining part of the spindle drive and abruptly relax. It is known for these drive springs to be secured by a housing of the spindle drive and/or the drive connectors. To some extent, further securing elements are also used herein.

Figure 1:
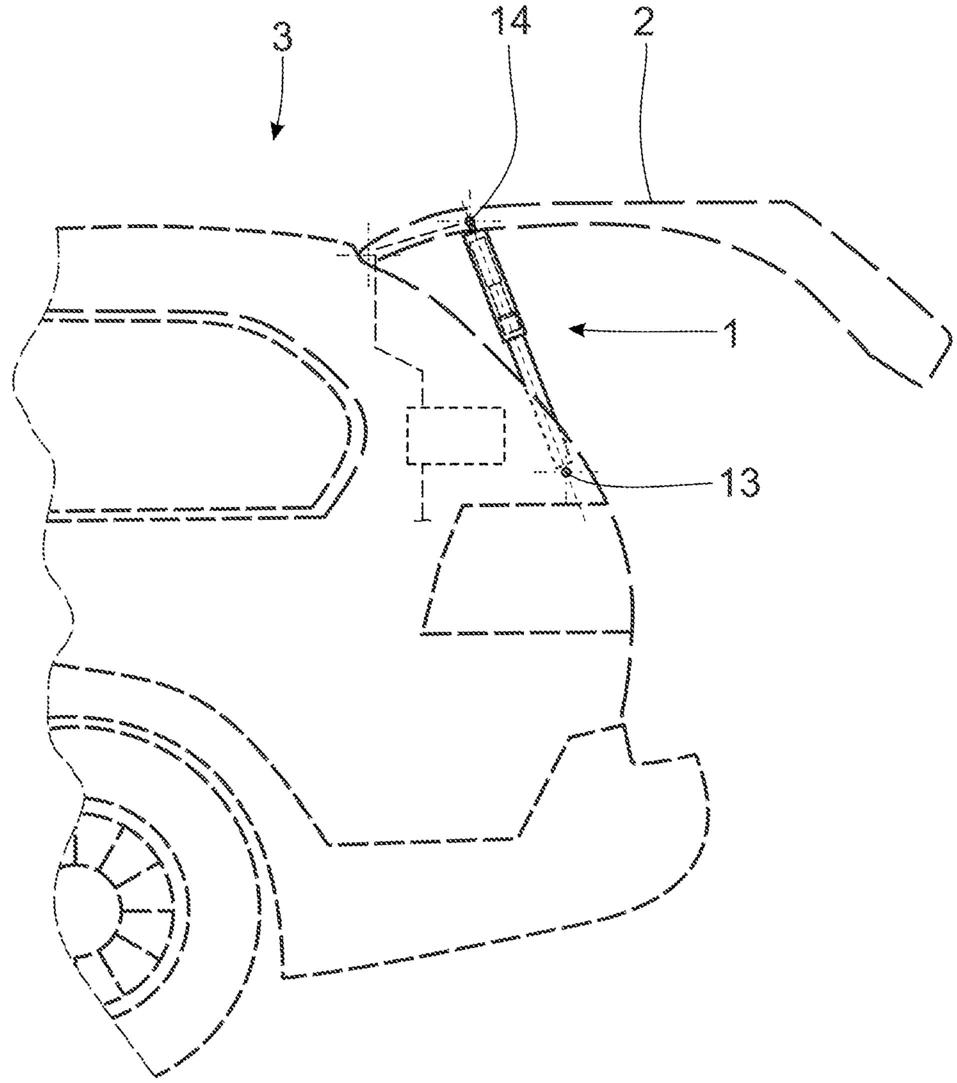

The assembly illustrated in FIG. 1 shows a single spindle drive 1 which serves for the motorized adjustment of a closure element 2, here a tailgate, of a motor vehicle 3. In principle however, all other closure elements 2 mentioned in the introduction of the description, in particular trunk lids, are also advantageously adjustable by means of the spindle drive 1. All embodiments pertaining to a tailgate likewise apply in analogous manner to all other conceivable closure elements 2.

Figure 2:
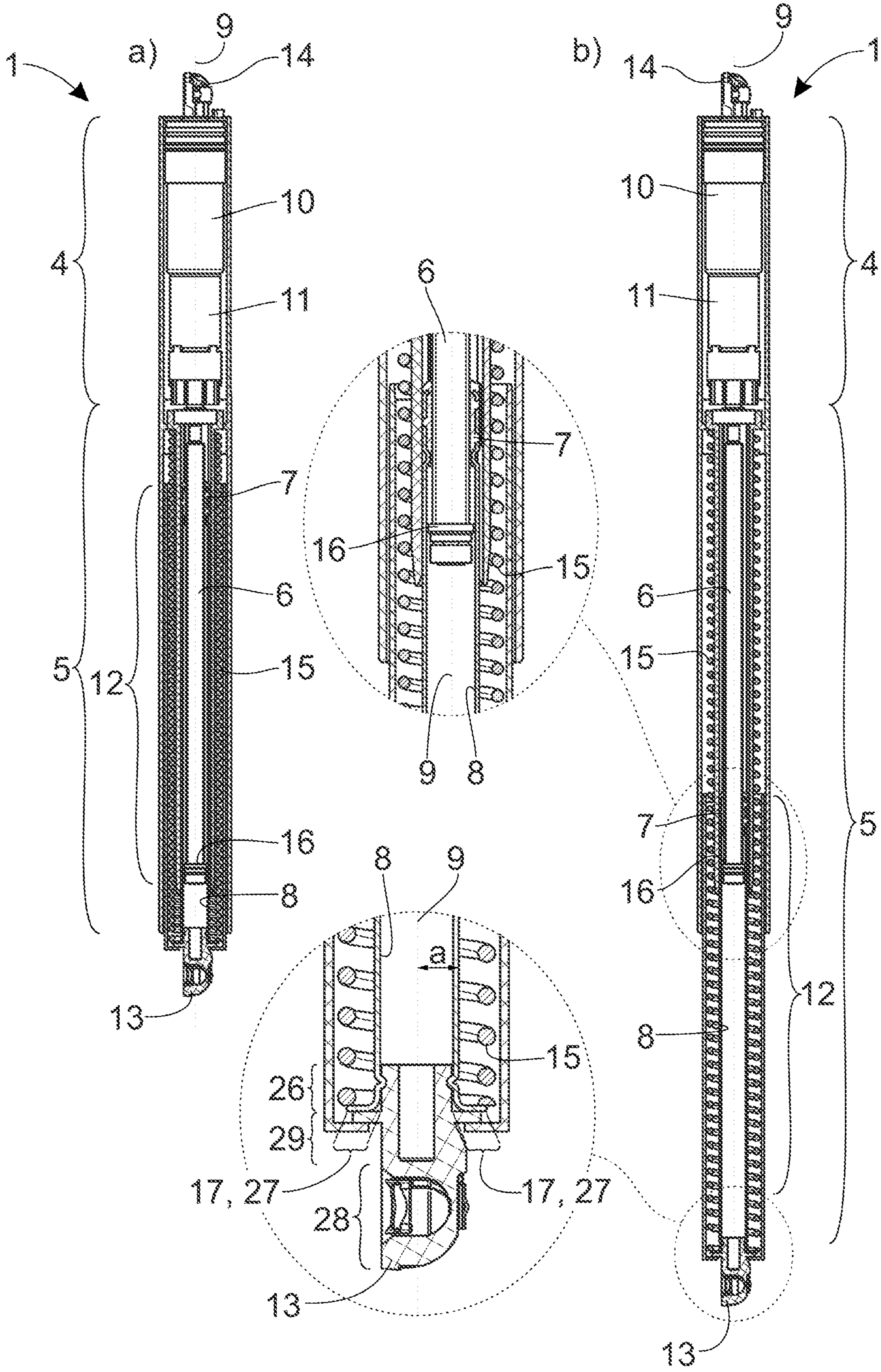
FIG. 2 in a sectional view shows the spindle drive according to the proposal and according to FIG. 1 in a) a retracted position and b) a deployed position.

As can be derived from FIG. 2, the spindle drive 1 has a drive unit 4 and a spindle/spindle nut gear mechanism 5 which in drive-operation terms is disposed downstream of the drive unit 4 and has a spindle 6, a spindle nut 7 and a spindle guide tube 8 for generating driving movements along a drive longitudinal axis 9. The drive unit 4 may include an electric drive motor 10 and an intermediate gearbox 11 which is disposed between the electric drive motor 10 and the spindle/spindle nut gear mechanism 5.

The spindle 6 meshes with the spindle nut 7. The spindle 6 herein may be driven by the drive unit 4. However, it is likewise conceivable that the spindle nut 7 is driven instead. In this way, the spindle/spindle nut gear mechanism 5 presently and preferably converts rotary driving movements of the drive unit 4 into linear driving movements of the spindle 6 or of the spindle nut 7.

The spindle guide tube 8 is connected in an axially fixed manner to the spindle nut 7 and is adjustable in a telescopic manner along the drive longitudinal axis 9 relative to the spindle 6. The spindle 6 in the spindle guide tube 8 runs in a spindle-guiding region 12 of the spindle guide tube 8. The spindle-guiding region 12 presently and preferably does not comprise the entire spindle guide tube 8. In principle however, it would also be conceivable for the spindle guide tube 8 to be relatively short in comparison to the spindle 6, and for the spindle 6 to be able to project from the spindle guide tube 8 on both sides. In this instance, the spindle-guiding region 12 could comprise the entire spindle guide tube 8. In either case, the spindle-guiding region 12 is the region in which the spindle 6 can be situated within the spindle guide tube 8.

The spindle drive 1 has drive connectors 13, 14 for discharging the driving movements. The drive connectors 13, 14 by means of the drive unit 4 are adjustable relative to one another along the drive longitudinal axis 9 between a retracted state (FIG. 2*a*)) and a deployed state (FIG. 2*b*)). As is illustrated in FIG. 1, one of the drive connectors 13 presently and preferably is connected to a motor vehicle body of the motor vehicle 3, and the other one of the drive connectors 14 is connected to the closure element 2 of the motor vehicle 3.

A first drive connector 13 of the drive connectors 13, 14 is connected in an axially fixed manner to the spindle guide tube 8. A second drive connector 14 of the drive connectors 13, 14 is connected in an axially fixed manner to the spindle 6. The drive connectors 13, 14 are thus adjusted relative to the spindle nut 7 and the spindle guide tube 8 by the telescopic adjustment of the spindle 6.

Furthermore provided is a drive spring 15, presently and preferably a helical spring and/or a compression spring, such as a helical compression spring. The drive spring 15 likewise serves for generating the driving movements along the drive longitudinal axis 9. To this end, the drive spring 15 acts on the drive connectors 13, 14 and preloads the latter, for example, away from one another.

The spindle guide tube 8, along at least one axial portion of the spindle-guiding region 12, for example, along the entire spindle-guiding region 12, proceeding from the drive longitudinal axis 9 has a first external radius a. It is provided here that the spindle guide tube 8 is round in the cross section. In this case, the external radius a is not dependent on an angle. In principle however, it would also be conceivable for the spindle guide tube 8 to have a different cross section. In this case, the external radius a may be the maximum radius of the spindle guide tube 8 in the spindle-guiding region 12. The spindle guide tube 8 may be in at least 50%, or at least 90%, of the axial extent of the spindle-guiding region 12, has a constant external radius a. Since the spindle 6 may be guided in the spindle-guiding tube 8 by way of a guide contour 16, and the spindle guide tube 8 may include a constant wall thickness, it is also obvious that the external radius a presently and preferably has to be constant in substantial parts of the spindle-guiding region 12.

As an example, the spindle guide tube 8 on the side thereof that faces the first drive connector 13 has a tube end portion 17 having a tube end edge 18. The tube end edge 18 is the material end of the spindle guide tube 8 on the end side. It is furthermore significant that the tube end portion 17 across at least part of the circumference thereof is radially enlarged, in particular bent open, in such a manner that the tube end edge 18, proceeding from the drive longitudinal axis 9, has an outer end edge radius e which is larger than the first external radius a, and that the enlarged tube end portion 17 secures the drive spring 15 in relation to a movement along the drive longitudinal axis 9. This can best be seen in the lower enlargement in FIG. 2, and in different variants in FIG. 3.

The tube end portion 17 extends from the beginning of the enlargement to the tube end edge 18. The outer end edge radius e, in terms of the same angular position about the drive longitudinal axis 9, is larger than the first external radius a. The outer end edge radius e, presently and preferably, is also constant at all angular positions about the drive longitudinal axis 9.

As has already been mentioned at the outset, the securing of the drive spring 15 serves to prevent that the drive spring 15, in particular in the case of an emergency such as a fire, does not perform any undesirable axial movement. The securing action here may be indirect. It may also be the case that the securing is associated with a transmission of force between the drive spring 15 and the tube end portion 17 only when other parts of the spindle drive 1 have broken off or have melted, or the like. This can best be explained by means of FIG. 3*a*). The drive spring 15 there is supported on the drive connector 13. The gaps shown there are indeed illustrated only for the purpose of improved identification of the individual parts, but it would be readily conceivable that no force is transmitted between the drive spring 15 and the enlarged tube end portion 17 during normal operation, because said force is completely dissipated by the drive connector 13. If the drive connector 13 breaks off, the tube end portion 17 however continues to secure the drive spring 15. All descriptions in terms of the operation of the spindle drive 1 refer to an assembled state of the spindle drive 1 on the motor vehicle 3.

In one or more embodiments, that the drive spring 15 in the assembled state is axially supported directly or indirectly on the enlarged tube end portion 17. As opposed to pure securing, supporting means that a force is actually transmitted from the drive spring 15 to the tube end portion 17. It is not necessary for this always to be the case here; the drive spring 15 in the deployed state of the spindle drive 1 could be relaxed, for example, but the drive spring 15 in the deployed state of the spindle drive 1 preferably also introduces a force, which is in particular not insignificant, into the drive connectors 13, 14.

Additionally or alternatively it can be provided that the enlarged tube end portion 17 secures the drive spring 15 in relation to a movement of the nearest spring winding 19 thereof and/or of a nearest spring end 20 in the axial direction past the tube end edge 18. In principle however, it would also be conceivable to secure the next to last spring winding, for example. The enlarged tube end portion 17 may secure the drive spring 15 in relation to being abruptly released, thus in relation to the drive spring 15 leaving the remaining spindle drive 1, which is not envisaged in this way.

In that the drive spring 15 is supported directly or indirectly on the enlarged tube end portion 17, the transmission of force is ensured during the opening procedure. Indirect support here means that a further separate element, by way of which the force is transmitted from the drive spring 15 to the enlarged tube end portion 17 during the opening procedure, is situated between the drive spring 15 and the enlarged tube end portion 17. In the case of a direct support, no further separate element is provided between the drive spring 15 and the enlarged tube end portion 17.

The enlarged tube end portion 17 may be enlarged across the entire circumference thereof. The tube end portion 17 may be evenly enlarged across the entire circumference thereof. Additionally or alternatively, the enlarged tube and portion 17 is enlarged radially in portions. It can be provided here on the one hand, that only one half of the circumference of the tube end portion 17 is enlarged for example, or that the tube end portion 17 is indeed completely enlarged across the entire circumference but for de-stressing is split into a plurality of circumferential portions. However, the enlarged tube end portion 17 may form a continuous enlarged collar. Alternatively, the enlarged tube end portion 17 include at least two, or at least three, or at least four, enlarged circumferential portions.

Figure 3:
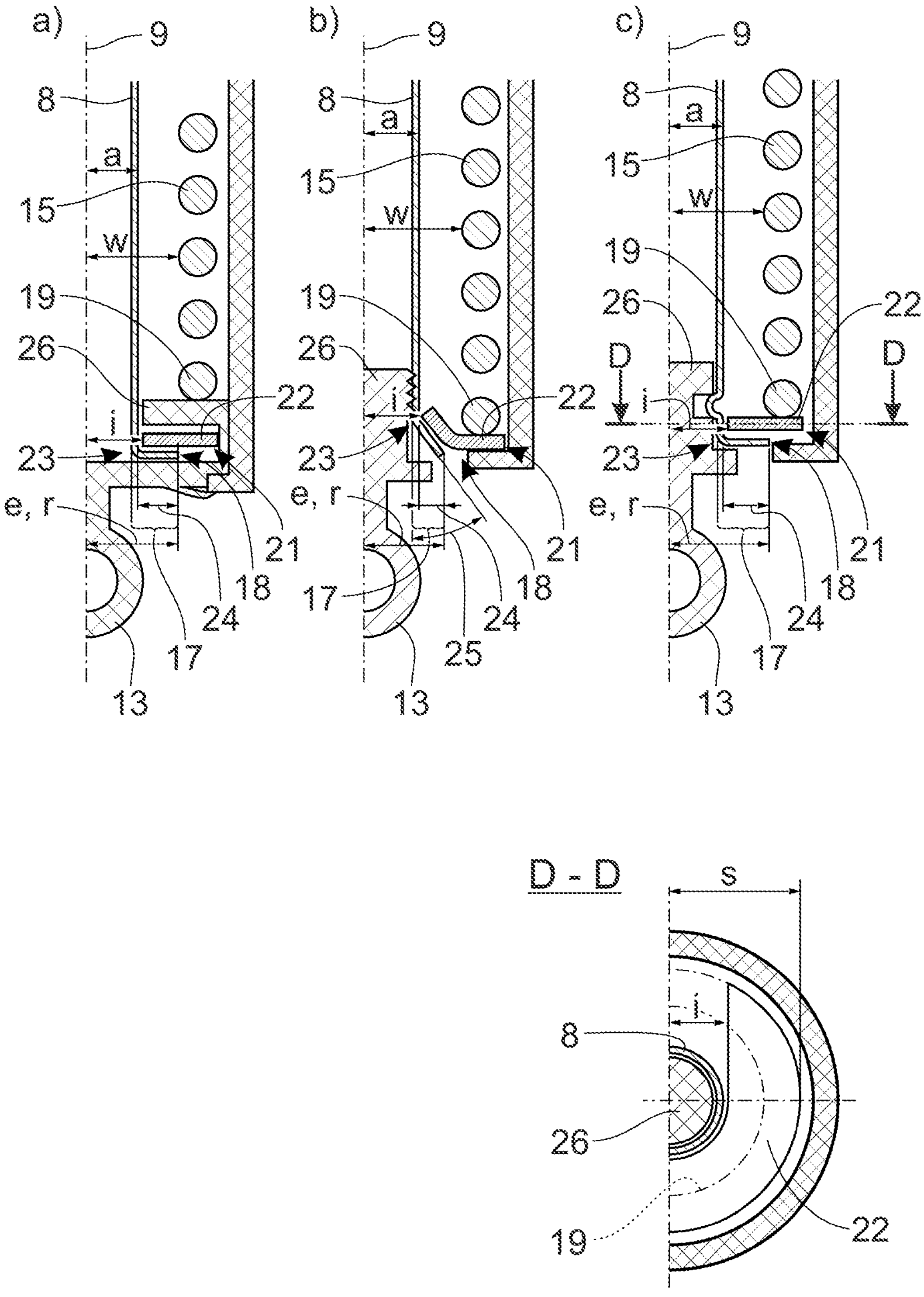
FIG. 3 in an enlarged view shows a detail of the drive according to the proposal and according to FIG. 1.

As is shown in FIG. 3, it can be provided that the spindle drive 1 has a securing element assembly 21 which is disposed between the drive spring 15 and the enlarged tube end portion 17 and has at least one securing element 22. The securing element assembly 21 may enable the drive spring 15 to be continuously secured, such as continuously supported, in the radial direction by way of fireproof materials and/or metal. As an example, in an imaginary absence of all not fireproof and/or non-metallic materials, a continuous connection between the drive spring 15 and the enlarged tube end portion 17 is created. It can be provided here in particular that only fireproof materials and/or metal are/is disposed in the axial direction between the drive spring 15 and the enlarged tube end portion 17. If the securing element 21 is configured from a fireproof material and/or metal, as is preferable, the latter is thus the case in FIGS. 3*b* and *c*). If the drive connector 13 is configured from plastics material, as an example, plastics material is disposed in the axial direction between the drive spring 15 and the enlarged tube end portion 17, as in FIG. 3*a*). The term "fireproof" here means that the corresponding material is in any case more fireproof than the drive connector 13 and/or a plastic part of the spindle drive 1.

The securing element 22 may be disposed axially between the drive spring 15 and the enlarged tube end portion 17 and at least partially, for example completely, encircles the spindle guide tube 8. The securing element 22 may be formed from a fireproof material and/or a metal. The securing element 22 can contact directly the drive spring 15 and/or the enlarged tube end portion 17. The securing element 22 may be designed in the shape of a disk having a centric receptacle for the spindle guide tube 8. In this way, said spindle guide tube 8 during assembling can be very easily pushed over the spindle guide tube 8 prior to the enlargement of the tube end portion 17, for example, or else be pushed over the spindle guide tube 8 from the other end after the enlargement.

It can be seen in the exemplary embodiment according to FIG. 2 that the drive spring 15 alternatively can directly contact the enlarged tube end portion 17 in the axial direction.

As can be derived from FIG. 3, the drive spring 15 may include a spring wire which has at least one spring winding 19, such as an end winding, that may include an inner winding radius w that proceeds from the drive longitudinal axis 9. No spring wire may be disposed along the entire drive spring 15 within the inner winding radius w, so that this is the overall minimum spring radius. The outer end edge radius e that may be smaller than the inner winding radius w of the at least one spring winding 19. Additionally or alternatively, the securing element 22, measured from the drive longitudinal axis 9, can have an internal radius i which is smaller than the outer end edge radius e. Additionally or alternatively, the securing element 22 can have an external radius s which is larger than the inner winding radius w. The drive spring 15, when the securing element 22 is imagined to be absent, can presently and preferably be moved past the enlarged tube end portion 17.

The tube end portion 17 may include a bend portion 23 in which the wall of the spindle guide tube 8 has a curved profile, and as an example straight securing portion 24 which adjoins the bend portion 23, runs in the radial direction so as to be transverse to the drive longitudinal axis 9 and secures the drive spring 15 in relation to a movement along the drive longitudinal axis 9.

FIGS. 3*a*) and 3*c*) show that the securing portion 24 by way of the bend portion 23 may be bent by an angle 25 of approximately 90°. Alternatively, the securing portion 24 by way of the bend portion 23 can be bent out of the spindle guide tube 8 by less than 90° or by more than 90°. The securing portion 24, as an example, terminates at the tube end edge 18 such that the tube end portion 17 is composed only of the bend portion 23 and the securing portion 24. The angle 25 is plotted in FIG. 3.

The first drive connector 13 presently and preferably has a connector portion 26. The connector portion 26 may be connected directly to the spindle guide tube 8. The connector portion 26 may protrude into the spindle guide tube 8 and from the inside is connected in a materially integral and/or form-fitting and/or force-fitting manner to the spindle guide tube 8. FIG. 3*a*) shows an alternative embodiment which may however also be additionally provided. In the latter, the connector portion 28 engages behind the enlarged tube end portion 17 and engages in particular in a form-fitting manner with the latter.

The securing element 22, or the at least one drive spring 15 and/or the spindle guide tube 8 may be formed from metal. Additionally or alternatively, the first drive connector 13 and/or the second drive connector 14 can be configured from a plastics material.

Proposed according to a further teaching, which is of independent significance, is a spindle drive 1 for a closure element 2 of a motor vehicle 3, in which likewise are provided a drive unit 4 and a spindle/spindle nut gear mechanism 5 which in drive-operation terms is disposed downstream of the drive unit 4 and has a spindle 6, a spindle nut 7 and a spindle guide tube 8 for generating driving movements along a drive longitudinal axis 9.

The spindle 6 meshes with the spindle nut 7, and the spindle guide tube 8 is connected in an axially fixed manner to the spindle nut 7. The spindle guide tube 8 is adjustable in a telescopic manner along the drive longitudinal axis 9 relative to the spindle 6. The spindle 6 in the spindle guide tube 8 runs in a spindle-guiding region 12 of the spindle guide tube 8.

The spindle drive 1 has drive connectors 13, 14 for discharging the driving movements. The drive connectors 13, 14 by means of the drive unit 4 are adjustable relative to one another between a retracted state and a deployed state along the drive longitudinal axis 9. A first drive connector 13 of the drive connectors 13, 14 is connected in an axially fixed manner to the spindle guide tube 8. A second drive connector 14 of the drive connectors 13, 14 is connected in an axially fixed manner to the spindle 6.

Furthermore provided is a drive spring 15, in particular a helical compression spring, for generating driving movements along the drive longitudinal axis 9. The drive spring 15 acts on the drive connectors 13, 14.

Proceeding from the drive longitudinal axis 9, the drive spring 15 has at least one spring winding 19, such as an end winding, having an inner winding radius w. The spindle guide tube 8 along at least one axial portion of the spindle guiding region 12, proceeding from the drive longitudinal axis 9, has a first external radius a.

It is significant according to this further teaching that the spindle guide tube 8 on the side thereof that faces the first drive connector 13 has a tube portion 27, that the tube portion 27 is at least partially radially enlarged, in particular bent open, that the tube portion 27 in the enlarged region has a maximum external tube radius r which is smaller than the inner winding radius w, that the spindle drive 1 has a securing assembly 21 having a securing element 22, that the securing element 22 on the drive spring side of the tube portion 27 is disposed about the spindle guide tube 8, and that the securing element 22 by way of the tube portion 27 secures the drive spring 15 in relation to a movement along the drive longitudinal axis 9.

All embodiments pertaining to the tube end portion 17 apply in analogous manner to the tube portion 27. However, the tube end edge 18 here can be disposed in an arbitrary manner. Said tube end edge 18, in particular following the tube end portion 27, can again be bent inward.

Reference in terms of the second teaching may be made to all embodiments pertaining to the first teaching, and vice versa.

The drive connectors 13, 14 can in each case be coupled to an articulated counterpart on the motor vehicle. At least the first drive connector 13, or both drive connectors 13, 14, has/have a bearing portion 28 for coupling to the articulated counterpart, in particular a ball socket or a ball head, and a connector portion 26 which is connected directly to the spindle guide tube, and a connection portion 29 which connects the bearing portion 28 to the connector portion 26. As has already been indicated, the drive connector 13, or as an example, both drive connectors 13, 14, respectively, is/are at least partially, formed from plastics material. Additionally or alternatively, the drive connector 13, or both drive connectors 13, 14, can be integrally configured.

Proposed according to yet one further teaching is a spindle drive 1 for a closure element 2 of a motor vehicle 3, wherein are provided a drive unit 4 and a spindle/spindle nut gear mechanism 5 which in drive-operation terms is disposed downstream of the drive unit 4 and has a spindle 6, a spindle nut 7 and a spindle guide tube 8 for generating driving movements along a drive longitudinal axis 9.

The spindle 6 meshes with the spindle nut 7. The spindle guide tube 8 is connected in an axially fixed manner to the spindle nut 7 and is adjustable in a telescopic manner along the drive longitudinal axis 9 relative to the spindle 6. The spindle 6 in the spindle guide tube 8 runs in a spindle-guiding region 12 of the spindle guide tube 8.

The spindle drive 1 has drive connectors 13, 14 for discharging the driving movements. The drive connectors 13, 14 by means of the drive unit 4 are adjustable relative to one another along the drive longitudinal axis 9, wherein a first drive connector 13 of the drive connectors 13, 14 is connected in an axially fixed manner to the spindle guide tube 8, and wherein a second drive connector 14 of the drive connectors 13, 14 is connected in an axially fixed manner to the spindle 6.

The spindle drive 1 furthermore has a drive spring 15, in particular a helical compression spring, for generating driving movements along the drive longitudinal axis 9. The drive spring 15 acts on the drive connectors 13, 14.

The spindle guide tube 8 along at least one axial portion of the spindle-guiding region 12, proceeding from the drive longitudinal axis 9, has a first external radius a.

It now is significant according to this teaching that the spindle guide tube 8 on the side thereof that faces the first drive connector 13 has a tube portion 27, that the tube portion 27 is at least partially radially enlarged, in particular bent open, that the tube portion 27 secures the drive spring 15 in relation to a movement along the drive longitudinal axis 9, that the first drive connector 13 has a bearing portion 28 for coupling to the articulated counterpart, in particular a ball socket or a ball head, and a connector portion 26 which is connected directly to the spindle guide tube 8, and a connection portion 29 which connects the bearing portion 28 to the connector portion 26, and that the drive connector 13 is integrally configured.

Reference in terms of the third teaching may be made to all embodiments pertaining to the first two teachings, and vice versa.

In one or more embodiments, the spindle guide tube 8, in the axial direction toward the drive connector 13, behind the tube portion 27 has an end portion which has an external end radius which is smaller than the maximum external tube radius r.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBER

1 spindle drive
2 closure element
3 motor vehicle
4 drive unit
5 spindle/spindle nut gear mechanism
6 spindle
7 spindle nut
8 spindle guide tube
9 drive longitudinal axis
10 electric drive motor
11 intermediate gearbox
12 spindle-guiding region
13 first drive connector
4 second drive connector
5 drive spring
16 guide contour
17 tube end portion
18 tube end edge
19 spring winding
20 spring end
21 securing element assembly
22 securing element
23 bend portion
24 securing portion
25 angle
26 connector portion
27 tube portion
28 bearing portion
29 connection portion While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A spindle drive for a closure element for use in a motor vehicle, the spindle drive comprising:

a drive unit;

a spindle and spindle nut gear mechanism disposed downstream of the drive unit the spindle and spindle nut gear mechanism including a spindle, a spindle nut, and a spindle guide tube collectively configured to at least partially generate driving movements along a drive longitudinal axis, the spindle guide tube having a round cross-section and a constant thickness across an entire length of the spindle guide tube and at least one open axial end;

the spindle meshes with the spindle nut, the spindle guide tube is axially fixed to the spindle nut and configured to be adjusted in a telescopic manner along the drive longitudinal axis relative to the spindle, the spindle is disposed in the spindle guide tube and configured to translate within in a spindle-guiding region of the spindle guide tube;

a number of drive connectors each configured to transfer the driving movements out of the spindle drive, the number of drive connectors collectively configured to be adjusted relative to one another along the drive longitudinal axis between a retracted state and a deployed state, a first drive connector of the number of drive connectors is axially fixed to the spindle guide tube, a second drive connector of the number of drive connectors axially fixed to the spindle; and a drive spring configured engage at least one of the number of drive connectors and to at least partially generate the driving movements along the drive longitudinal axis, wherein the spindle guide tube includes a first external radius extending along at least one axial portion of the spindle guiding region, the spindle guide tube including a tube end portion disposed on a side of the spindle guide tube facing the first drive connector, the tube end portion provided with a tube end edge, at least a portion of a circumference of the tube end portion is radially enlarged with respect to other portions of the spindle guide tube so that the tube end edge includes an outer end edge radius in relation to the drive longitudinal axis, the outer end edge radius is larger than the first external radius, and the tube end portion is configured to secure the drive spring to inhibit movement of the drive spring along the drive longitudinal axis.

2. The spindle drive of claim 1, wherein in an assembled state of the spindle drive, the drive spring is axially supported directly or indirectly by the tube end portion.

3. The spindle drive of claim 1, wherein an entirety of the circumference of the tube end portion is radially enlarged with respect to other portions of the spindle guide tube.

4. The spindle drive of claim 1, further comprising:

a securing element assembly disposed between the drive spring and the tube end portion, the securing element assembly including at least one securing element.

5. The spindle drive of claim 4, wherein the securing element is axially disposed between the drive spring and the tube end portion to at least partially encircle the spindle guide tube.

6. The spindle drive of claim 4, wherein a spring wire of the drive spring includes at least one spring winding provided with an inner winding radius, and the outer end edge radius is less than the inner winding radius, or the securing element includes an internal radius in relation to the drive longitudinal axis, the internal radius of the securing element is smaller than the outer end edge radius, or the securing element includes an external radius, the external radius of the securing element is larger than the inner winding radius.

7. The spindle drive of claim 4, wherein, the securing element assembly is configured to continuously secure the drive spring.

8. The spindle drive of claim 4, wherein the at least one securing element is comprised of metal.

9. The spindle drive of claim 1, wherein the drive spring directly contacts the tube end portion in an axial direction.

10. The spindle drive of claim 1, wherein the tube end portion includes a bend portion, in which a wall of the spindle guide tube includes a curved profile.

11. The spindle drive of claim 10, wherein the wall of the spindle guide tube includes a straight securing portion adjoining the bend portion, the bend portion extending in a radial direction transverse to the drive longitudinal axis.

12. The spindle drive of claim 1, wherein the first drive connector includes a connector portion connected directly to the spindle guide tube.

13. The spindle drive of claim 1, further comprising:

a securing element assembly disposed between the drive spring and the tube end portion, the securing element assembly including at least one securing element, wherein at least one of the securing element, the drive spring, and the spindle guide tube is formed of metal.

14. The spindle drive of claim 1, wherein each the number of drive connectors are configured to be coupled to an articulated counterpart disposed on the motor vehicle, wherein at least one of a first drive connector or a second drive connector of the number of drive connectors includes a bearing portion, a connector portion, and a connection portion, the bearing portion configured to be coupled to the articulated counterpart, the connector portion connected directly to the spindle guide tube, and the connection portion connecting the bearing portion to the connector portion, and wherein the first drive connector is formed of a plastic material.

15. The spindle drive of claim 1, wherein the drive spring is a helical compression spring.

16. The spindle drive of claim 1, wherein the tube end edge is bent open with respect to the tube end portion.

17. The spindle drive of claim 1, wherein the connector portion protrudes into the spindle guide tube and is connected to the spindle guide tube in a materially integral, form-fitting, and/or force-fitting manner.

18. A spindle drive for a closure element of a motor vehicle, the spindle drive comprising:

a drive unit;

a spindle and spindle nut gear mechanism disposed downstream of the drive unit, and including a spindle, a spindle nut, and a spindle guide tube configured to generate driving movements along a drive longitudinal axis, the spindle guide tube having a round cross-section and a constant thickness across an entire length of the spindle guide tube and at least one open axial end;

wherein the spindle meshes with the spindle nut, the spindle guide tube axially fixed to the spindle nut and configured to be adjusted in a telescopic manner along the drive longitudinal axis relative to the spindle, the spindle is disposed in the spindle guide tube and configured to translate in a spindle-guiding region of the spindle guide tube;

a number of drive connectors configured to be adjusted relative to one another by the drive unit along the drive longitudinal axis between a retracted state and a deployed state to transfer the driving movements out of the spindle drive, wherein a first drive connector of the number of drive connectors is axially fixed to the spindle guide tube, a second drive connector of the number of drive connectors axially fixed to the spindle; and a drive spring configured to generate driving movements along the drive longitudinal axis, wherein the drive spring acts on the number of drive connectors, wherein the drive spring includes at least one spring winding provided with an inner winding radius;

wherein at least one axial portion of the spindle guiding region has a first external radius, wherein the spindle guide tube includes a tube portion disposed on a side of the spindle guide tube facing the first drive connector, the tube portion including an enlarged region, the enlarged region is at least partially radially enlarged with respect to other portions of the spindle guide tube, the enlarged region has a maximum external tube radius, the maximum external tube radius is smaller than the inner winding radius;

a securing assembly provided with a securing element, the securing element on a drive spring side of the tube portion is disposed about the spindle guide tube, the securing element, by way of the tube portion, is configured to secure the drive spring to inhibit movement of the drive spring along the drive longitudinal axis.

19. A spindle drive for a closure element of a motor vehicle, the spindle drive comprising:

a drive unit;

a spindle and spindle nut gear mechanism disposed downstream of the drive unit, and including a spindle, a spindle nut, and a spindle guide tube collectively configured to at least partially generate driving movements along a drive longitudinal axis, wherein the spindle meshes with the spindle nut, and the spindle guide tube has a round cross-section and a constant thickness across an entire length of the spindle guide tube and at least one open axial end, wherein the spindle guide tube is connected to and axially fixed to the spindle nut, the spindle guide tube is adjustable in a telescopic manner along the drive longitudinal axis relative to the spindle, the spindle is disposed in the spindle guide tube and configured to translate within a spindle-guiding region of the spindle guide tube;

a number of drive connectors each configured to discharge the driving movements, wherein the number of drive connectors are each configured to be adjusted by the drive unit relative to one another along the drive longitudinal axis between a retracted state and a deployed state, a first drive connector of the number of drive connectors is connected to and axially fixed to the spindle guide tube, a second drive connector of the number of drive connectors is connected to and axially fixed to the spindle;

a drive spring configured to engage at least one of the number of drive connectors to at least partially generate the driving movements along the drive longitudinal axis;

wherein along at least one axial portion of the spindle guiding region the spindle guide tube has a first external radius, the spindle guide tube including a tube portion disposed on a side of the spindle guide tube facing the first drive connector, the tube portion is at least partially radially enlarged with respect to other portions of the spindle guide tube, the tube portion is configured to secure the drive spring to inhibit movement of the drive spring along the drive longitudinal axis, the first drive connector is provided with a bearing portion, a connector portion, and a connection portion, the bearing portion is configured to couple the spindle guide tube to an articulated counterpart, the connector portion is connected directly to the spindle guide tube, and the connection portion is connecting the bearing portion to the connector portion, and wherein the bearing portion, the connector portion, and the connecting portion of the first drive connector are integrally formed with one another.

20. The spindle drive of claim 19, wherein the articulated counterpart is a ball socket or a ball head.

* * * * *